United States Patent

[11] 3,616,403

[72] Inventors Robert H. Collins
Wappingers Falls;
Joseph S. Logan, Poughkeepsie, both of N.Y.

[21] Appl. No. 770,477
[22] Filed Oct. 25, 1968
[45] Patented Oct. 26, 1971

[73] Assignee International Business Machines Corporation
Armonk, N.Y.

[54] PREVENTION OF INVERSION OF P-TYPE SEMICONDUCTOR MATERIAL DURING RF SPUTTERING OF QUARTZ

6 Claims, 3 Drawing Figs.

[52] U.S. Cl. .......... 204/192
[51] Int. Cl. .......... C23c 15/00
[50] Field of Search .......... 204/192

[56] References Cited

UNITED STATES PATENTS

| | | | |
|---|---|---|---|
| 3,432,417 | 3/1969 | Davidse et al. | 204/192 |
| 3,343,049 | 6/1964 | Miller et al. | 317/235 |

OTHER REFERENCES

Davidse, " Theory & Practice of RF Sputtering," Vacuum, Vol. 17, No. 3, 1966.

*Primary Examiner*—Howard S. Williams
*Assistant Examiner*—Sidney S. Kanter
*Attorneys*—Hanifin and Jancin and Howard J. Walter

ABSTRACT: Method for preventing inversion of semiconductor surfaces during RF sputtering of dielectrics by maintaining a low flat band charge level at the semiconductor interface. The flat band charge level is controlled by rigidly maintaining various parameters of the sputtering system such as target purity, and RF power density, in conjunction with the presence of a thin layer of phosphosilicate glass on the semiconductor which is supported on a dielectric material in floating mode.

INVENTORS
ROBERT H COLLINS
JOSEPH S. LOGAN

BY

Howard J. Walter Jr.
AGENT

PREVENTION OF INVERSION OF P-TYPE SEMICONDUCTOR MATERIAL DURING RF SPUTTERING OF QUARTZ

BACKGROUND

1. Field of the Invention

This invention relates to RF sputtering of insulating materials and more particularly to a method for preventing inversion of P-type semiconductor materials during RF sputtering of a dielectric.

2. Description of the Prior Art

In the manufacture of semiconductor devices, it has become commonplace o passivate semiconductor materials with a layer of silicon dioxide. Various methods have been used to apply this $SiO_2$ layer. These include vapor oxidation and glass sedimentation techniques. For further details of the glass sedimentation techniques see: Pliskin, U.S. Pat. No. 3,212,921, issued Oct. 19, 1965 to the assignee of the instant invention, entitled, "Method of Forming A Glass Film on an Object and Product Produced Thereby."

It was found by Thomas et al., "Space Charge Model for Surface Potential Shifts in Silicon Passivated with Thin Insulating Layers;" IBM Journal of Research and Development, Vol. 8, No. 4, page 368, that the presence of $Si0_2$ on P-type semiconductor material tended to produce an n-shift in the silicon surface during certain environmental conditions. This shift has been attributed to a positive space charge in the $Si0_2$ layer.

Kerr, et al. "Stabilization of $SiO_2$ Passivation in Layers with $P_20_5$," IBM Journal of Research and Development, Vol. 8, No. 4, page 376, suggests that the inversion in P-type semiconductor material is due to an oxygen deficiency in the $Si0_2$ layer. To remedy this situation it is suggested that a layer of phosphosilicate glass be placed over the $SiO_2$ insulating layer to supplement the oxygen deficiency. U.S. Pat. No. 3,343,049 to Miller et al., granted Sept. 19, 1967 and entitled, "semiconductor Devices and Passivation Thereof" describes several semiconductor structures embodying this concept.

Until the advent of RF sputtering the above method proved to be successful in preventing inversion in semiconductor materials when glass layers were applied over the phosphosilicate layer. However, when attempts were made to sputter $Si0_2$ on oxide coated semiconductor surfaces, it was observed that inversion of P-type semiconductor surfaces would take place even though a sufficient quantity of $P_20_5$ were present which would normally prevent inversion during the application of $Si0_2$ by other methods.

SUMMARY OF THE INVENTION

It is therefore an object of this invention to prevent the inversion of P-type semiconductor material during RF sputtering of insulating material.

It is another object of this invention to improve the quality of oxide coated semiconductor devices.

In accordance with the instant invention semiconductor inversion is prevented by rigidly maintaining sputtering parameters such as target purity, RF power density which influences substrate temperature, and the inclusion of a phosphosilicate glass blocking layer.

The foregoing and other object, features and advantages of the invention will be apparent from the following more particular description of a preferred embodiment of the invention, and illustrated in the accompanying drawings.

DRAWINGS

DESCRIPTION

Figure 1:
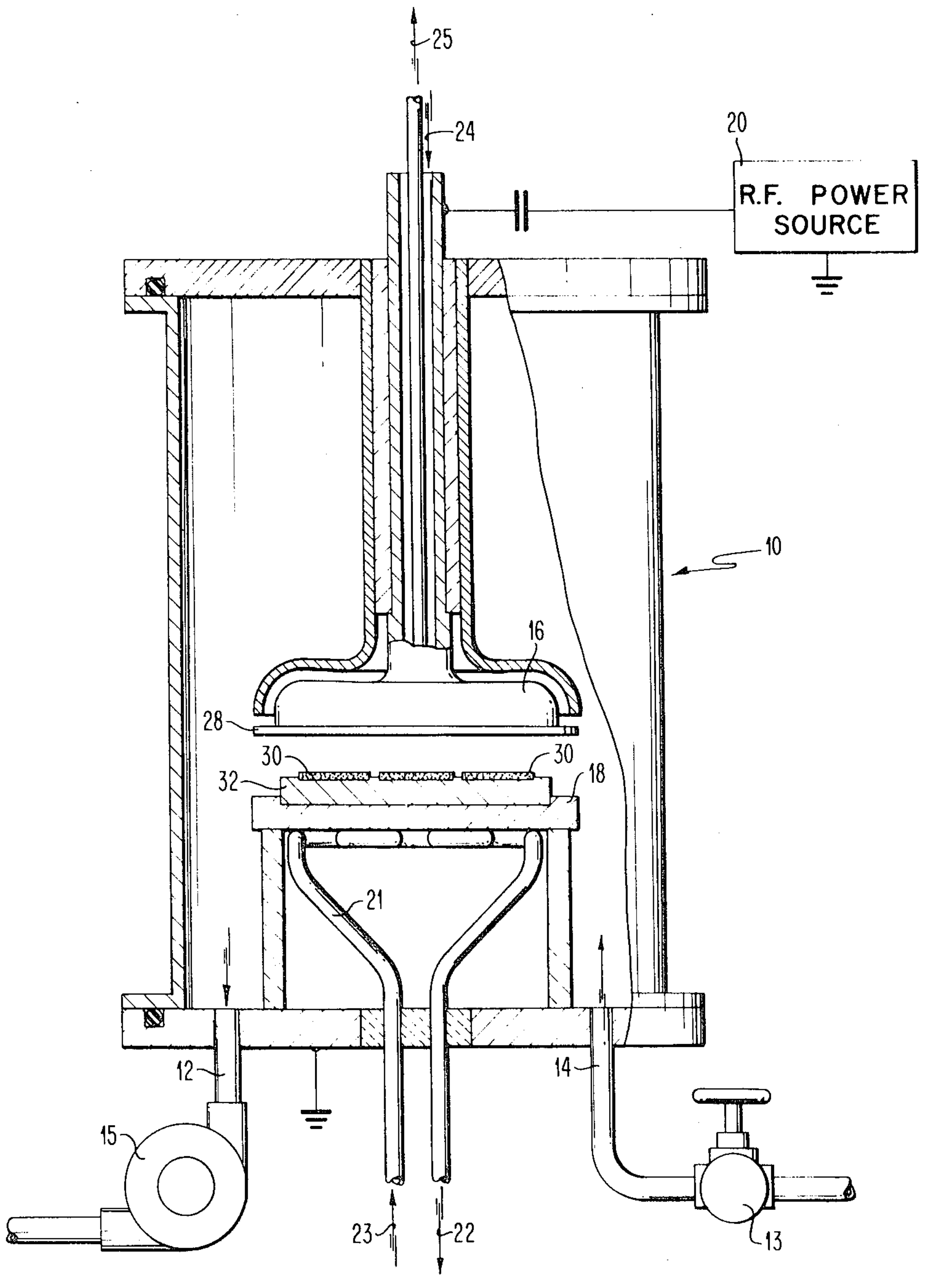
FIG. 1 is a cross-sectional, schematic view of a typical sputtering apparatus suitable for practicing the method of the instant invention.

Typical apparatus useful in carrying out the method of the instant invention is illustrated in FIG. 1. The apparatus may be constructed in accordance with that shown in U.S. Pat. No. 3,369,991 to Davidse, et al., entitled, "Apparatus for Cathode Sputtering Including a Shielded RF Electrode" issued Feb. 20, 1968 to the assignee of the instant application. This patent is herein expressly incorporated by reference.

Referring now to FIG. 1, there is provided a vacuum of at least 5 microns of mercury. A suitable inert gas, such as argon, is admitted by valve 13 through inlet port 14 while the proper vacuum is maintained by vacuum pump 15 which is attached to exhaust port 12. Within the vacuum chamber 10 there are positioned a cathode electrode, generally designated 16, and an anode electrode, generally designated 18. The terms "-cathode" and "anode" are employed merely for convenience herein. Inasmuch as the sputtering apparatus is excited by a radiofrequency power source 20, the portion of the structure respectively designated the "cathode" and "anode" will actually function as cathode and anode respectively during the negative half-cycles of the applied radio frequency excitation and during the intervening positive half-cycle the polarities of the electrodes are reversed, but in the present apparatus this does not affect the reversal of the sputtering operation.

In order to provide control of the temperature of the electrodes, cooling tubes 31 are provided for circulating water to the anode as indicated by arrows 22 and 23. Arrows 24 and 25 indicate the flow of coolant through the cathode 16.

The quartz target 28 is mounted on the cathode. Silicon semiconductor substrates 30 are mounted for sputtering on the anode 18. There also may be provided a quartz spacer 32 between the substrate and the anode. The spacer 32 may be of other type dielectric material or metals as desired.

Figure 2A:
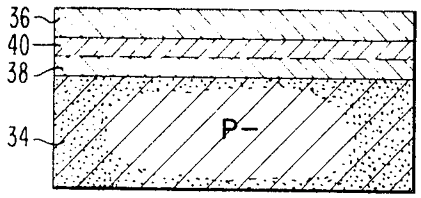
FIG. 2A and 2B is a sectional view of a semiconductor substrate having various dielectric layers applied thereto.
Figure 2B:
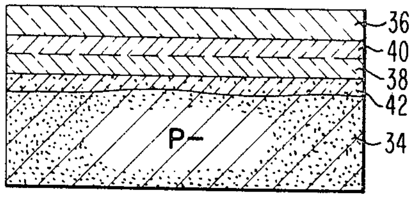

Referring to FIG. 2A there is shown a section of a typical silicon semiconductor substrate of the type produced in accordance with the method herein disclosed. FIG. 2B shows a typical substrate wherein an inversion has occurred. FIG. 2A shows a P-type silicon semiconductor member 34 upon which has been sputtered a $Si0_2$ layer 36. It is desireable to provide a thin layer of thermally grown $Si0_2$ 38 having diffused therein a quantity of phosphosilicate glass 40.

FIG. 2B illustrates the N-type inversion layer which may form when attempting to sputter the $Si0_2$ layer 36 by methods other than those taught herein.

The appearance of an inversion layer in the P-type semiconductor material has been attributed to a build up of a positive space charge at the silicon/$SiO_2$ interface. Previous experience with DC sputtering in the prior art would indicate that an electric field would not exist in a growing insulating film when depositing in the "floating mode" which would cause positive ion migration to the surface of the semiconductor, and therefore cause inversion. Existing theories would predict a negative potential on the surface of the insulator. For a silicon wafer mounted in the so-called "floating" mode—i.e., substrate separated from the anode by a thin piece of quartz or other insulator, one would expect that the silicon would assume the same potential as the surface of the insulator. This would result in a zero field in the insulator. This is to be contrasted with the fact P-type silicon semiconductor materials when RF sputtered in a floating mode with silicon dioxide showed large charge buildup at the $Si0_2$-Si interface. This charge buildup normally measurable as the flat band charge ($N_{FB}$) is a primary indicator that inversion has or will take place in the semiconductor material.

In accordance with this invention it has been recognized that the charge buildup at the interface is ionic in nature and may be limited or controlled by various means.

It has been found that in order to prevent inversion of P-type semiconductor materials during RF sputtering of quartz, it is necessary to maintain a flat band charge level of less than $5\times10^{12}$ charges/cm.$^2$. Flat band charge densities of less than this value may successfully be dissipated by annealing the sputtered $SiO^2$ layer after sputtering is completed. The several system parameters which were found to be capable of maintaining the specified flat band charge level include target purity, substrate temperature, and the presence of a predeposited phosphosilicate glass layer on the silicon substrate.

The influence of these various parameters will now be discussed.

Since it has been determined that the cause of the inversion is due to ionic migration, despite the apparent contradiction of prevailing theories, the following parameters have been shown to directly affect the ionic migration during the sputtering process.

The temperature of the substrate must be kept below a designated minimum in order to reduce the mobility of the undesired impurity ions causing inversion. This may be accomplished by directly cooling the substrate or by controlling the power input level which will indirectly affect the temperature of the substrate. It has been found that if the temperature of the substrate can be maintained below 250° C. during deposition, inversion may be prevented.

Target purity, because it is a source of ionic impurities, is also a critical parameter. It has been found that if the purity of the target material is maintained such that its ionic impurities are not in excess of $1\times10^{17}$ ions/cm.$^2$ inversion may be prevented.

Finally, it has been found that by preventing the migration of ions from the sputtered layers to the substrate, inversion may be prevented. This may be accomplished by providing a barrier of phosphosilicate glass having a thickness in excess of 500 A. between the substrate and the sputtered film. It has also been found that the application of a DC potential of between 50 to 100 volts across the substrate during sputtering will prevent migration of ions and thereby prevent inversion. The application of DC potential can be conveniently achieved by the apparatus disclosed and claimed in copending and commonly assigned application Ser. No. 668,114 entitled, "RF Sputtering Method and Apparatus for Producing Insulating Films of Various Physical Properties."

It should be mentioned that any of the parameters as disclosed if carried to its extreme will each independently prevent inversion and that in any typical operating system in which any or all of the parameters are controlled, inversion may be prevented by selecting proper combinations of the variables in accordance with the teachings of the invention.

In the preferred method herein described RF sputtering is performed in the "floating" mode; that is, the substrates are electrically isolated from the metallic anode 18 by a thin quartz spacer 32. It is recognized that the use of a gallium backside contact on the substrate makes possible the maintaining of very low substrate temperatures which in turn result in low charge levels. However, the use of gallium inherently introduces difficulties discussed previously.

Before discussing the effects of the various parameters, one method of preparing wafers for deposition will be described.

P-silicon wafers having 5–20 ohm-cm. resistivity were initially oxidized by the dry-wet-dry process. The wafers were exposed at approximately 1,100° C. to dry oxygen for a period of 30 minutes, then exposed to steam for 10 minutes, and finally to dry oxygen for 15 minutes. The oxidized wafers were then etched by a solution comprising 10 parts of 60% $NH_4F$ and 1 part 40% HF for 60 seconds. Thereafter, $P_2O_5$ was diffused into the oxidized wafers by the well-known open-tube diffusion method carried out at about 970° C. by the serial application of oxygen, $POCl_3$ and oxygen, wherein the concentration of the $POCl_3$ was 2,000 p.p.m. A drive-in step of 5 minutes dry oxygen, 55 minutes steam, 45 minutes dry oxygen was carried out at about 970° C. Measurements were made of the phosphosilicate glass thickness and etch rates by plotting the glass thickness versus time in a selective etch as described by W. A. Pliskin and R. P. Gnall, J. Electrochemical Society, Vol. 111, page 872 (1964).

Thereafter, the various wafers were selectively masked and portions of the phosphosilicate glass layer were removed to give various step thicknesses of glass on each wafer.

The prepared wafers were then paced in a sputtering device similar to that shown in FIG. 1. In each case the cathode anode distance was approximately 1 inch.

Example I

In an attempt to determine the effect of the presence of phosphosilicate glass of various thicknesses on the oxidized wafers, several wafers prepared as described above were lace on the anode 18 in a floating mode by separating the wafers from anode 18 by a quartz spacer 32. A 12-inch diameter quartz target 8 was mounted on cathode 16. The target was natural fused quartz (GE type 204) having a positive impurity ion density of $10^{18}$ charges/cm.$^3$. The vacuum chamber 10 was exhausted through port 12 and argon introduced through port 14 at a pressure of 15–20 microns.

Figure 3:
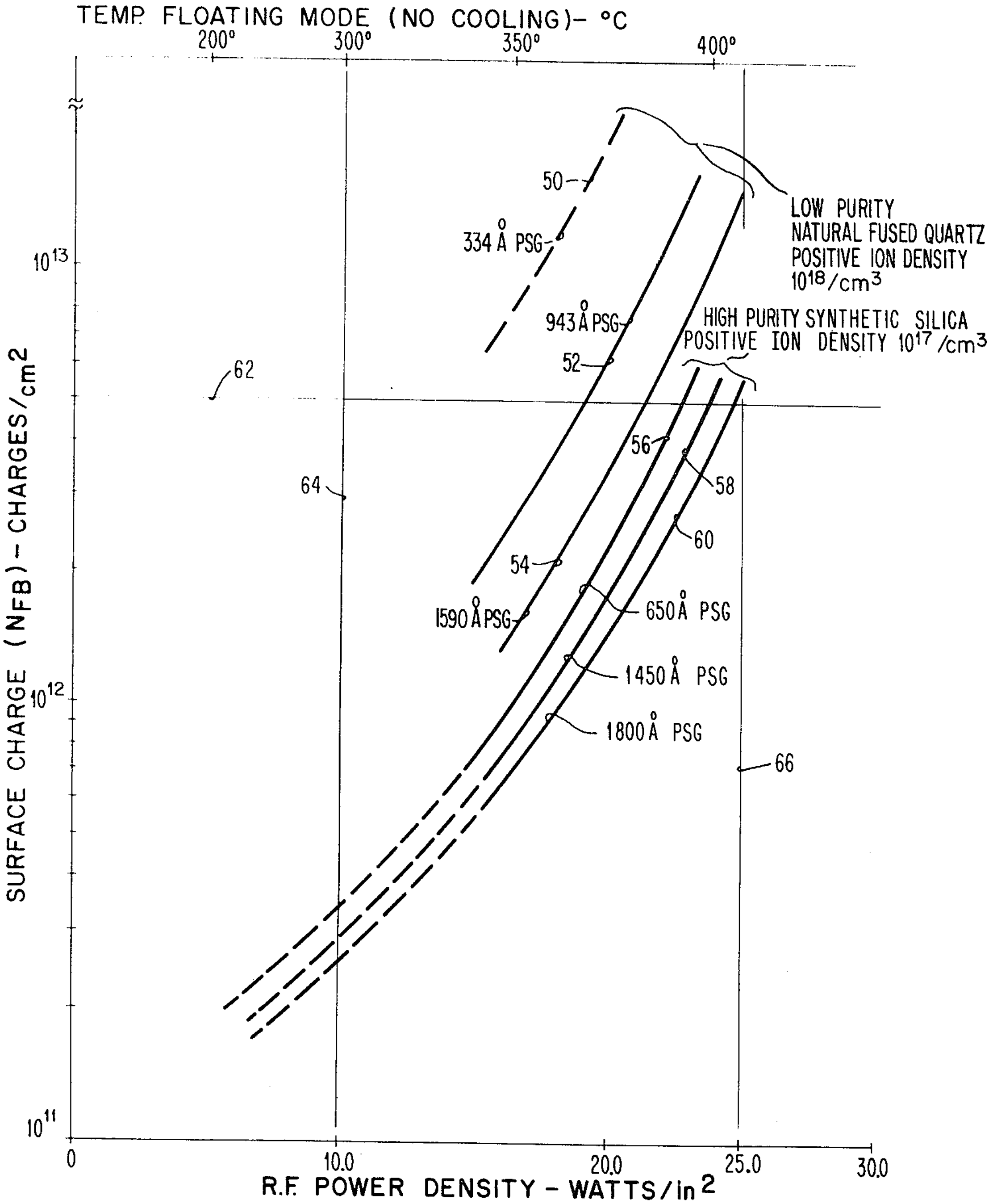
FIG. 3 is a graphical representation of the empirical relationship between the flat band charge level ($N_{FB}$) versus RF power density for each of two different target materials at various phosphosilicate glass thicknesses.

A variable RF power source was applied across the cathode and anode for approximately 1 hour on each run. No attempt was made to control the temperature of the wafers during deposition. The results are tabulated in table I below. Curves 50, 52, and 54 of FIG. 3 show the approximate empirical correlation between power level and surface charge for the various $P_2O_5$ layer thicknesses. The flat band charge levels ($N_{FB}$) were determined after evaporating aluminum contacts to each section of the wafers and evaluating MOS capacitance-voltage measurements.

Table I

Example I—Low Purity Target

| Power Density Watts/in.$^2$ | PSG Thickness Angstroms | $N_{FB}$ charges/cm.$^2\times10^{12}$ |
|---|---|---|
| 28.8 | 1,590 | >11 |
| | 943 | >11 |
| | 334 | >11 |
| 24.0 | 1,590 | >4.5 |
| | 943 | >11 |
| 334 | | >11 |
| 19.2 | 1,590 | 1.9–2.0 |
| | 943 | 3.9–4.1 |
| | 334 | >11 |
| 16.3 | 1,590 | 1.8–2.2 |
| | 943 | 3.1–3.4 |
| | 334 | 9 |

This data illustrates the effect of varying the power level and $P_2O_5$ glass thicknesses on the surface charge. The same target was used in all runs. It illustrates appropriate combinations of target purities, $P_2O_5$ glass thicknesses and power levels for practicing the method of the invention

Example II

In order to determine the effect of target purity on the flat band charge level, a high purity synthetic silica target (Corning Type 7940) having an impurity ion density of $1\times10^{17}$ ions/cm.$^3$ was used as a target. A series of runs was made at various RF input levels as in example I.

Table II

Example II—High Purity Target

| Power Density Watts/in.$^2$ | PSG Thickness Angstroms | $N_{FB}$ charges/cm.$^2\times10^{12}$ |
|---|---|---|
| 24.0 | 1,800 | 4.2–6.4 |
| | 1,450 | 5.6–6.7 |
| | 650 | 5.1–5.3 |
| 22.1 | 1,800 | 3.6–4.2 |
| | 1,450 | 7.3–10.2 |
| | 650 | 5.9–6.5 |
| 20.2 | 1,800 | 1.3–1.8 |
| | 1,450 | 1.6–1.9 |
| | 650 | 2.3–2.5 |
| 18.25 | 1,800 | 0.91–1.01 |

| | | |
|---|---|---|
| | 1,450 | 1.09–1.2 |
| | 650 | 1.61–1.73 |
| 16.3 | 1,800 | 0.62 |
| | 1,450 | 0.76 |
| | 650 | 0.93 |

The results, tabulated in table II and graphically shown in FIG. 3, indicate that for any particular power level the flat band charge level produced is lower for the high purity target than for the low purity target. A comparison of curves 56, 58, and 60 with curves 50, 52, and 54 provides graphic illustration.

The results indicate that each of the three variables, i.e., power level, which influence substrate temperature, phosphosilicate glass thickness, and target purity influences the surface charge. Therefore, practice of the method of the invention involves a proper balance or selection of process variables.

To insure accuracy and reproducibility suitable for commercial applications, various combinations of the above parameters are suggested. One successful combination is (1) minumum phosphosilicate glass, thickness of 500 A., more preferably 1,000 A. (2) target impurity of not greater than $1\times10^{18}$ ions/cm.$^3$ more preferably not greater than $1\times10^{17}$ ions/cm.$^3$ and (3) an applied RF power density in the range of 10 to 25 watts/in.$^2$, more preferably 15 to 20 watts/in.$^2$. Use of a power density less than 10 watts/in.$^2$ results in a deposition of an undesirably porous film when sputtering by the floating mode technique. The power density is not sufficient to generate deleterious heat in the substrate. Conversely use of a power density greater than 25 watts/in./$^2$ results in a substrate temperature which permits migration of impurity ions to the surface.

FIG. 3 provides a graphic indication of the ranges of the process variables which can be construed to define the practice of the method of the invention. Line 62 indicates on the ordinate the allowable surface charge. It is the objective of the invention to restrict flat band charge level to $5\times10^{12}$ charges/cm.$^2$ or less, i.e., to the area below line 62. Lines 64 and 66 define the end limits of RF power density i.e., 10 to 25 watts/in.$^2$. Obviously additional curves, similar to curves 50, 52, 54, 56, 58, and 60, can be drawn on FIG. 3 for different $P_2O_5$ thicknesses and targets having different positive impurity ion densities equal to or less than $1\times10^{18}$ ions/cm.$^3$. The portions of the curves which fall within the area defined by liens 62, 64, and 66 constitute practice of the method of the invention. Note that the corresponding substrate temperature, when utilizing the floating mode, is given on FIG. 3.

Finally, it has been determined that the application of a negative bias to the substrate during deposition also aids in the prevention of inversion during sputtering. The apparatus for applying the negative potential necessary for this application is disclosed in copending application Ser. No. 668,114 entitled, "RF Sputtering Method and Apparatus for Producing Insulating Films of Various Physical Properties." The apparatus disclosed therein is expressly incorporated by reference herein. A negative potential of form 50–100 volts has been found to prevent inversion during sputtering.

While the invention has been particularly shown and described with reference to preferred embodiments thereof, it will be understood by those skilled in the art that various changes in form and details may be made therein without departing from the spirit and scope of the invention.

What we claim is:

1. A method for forming a dielectric film on a semiconductor substrate in which the formation of an inversion layer in said substrate is prevented during RF sputtering of a semiconductor substrate surface to remain less than $5\times10^{12}$ charges per centimeter squared wherein said semiconductor substrate and a dielectric target on the cathode electrode are contacted with a RF stimulated glow discharge to initiate sputtering of said target, the improvement comprising:

supporting the semiconductor substrate in floating mode on a dielectric material on the anode electrode, providing a predeposited layer of phosphosilicate glass having a thickness of at least 500 A., providing a target having a positive impurity ion density less than $1\times10^{18}$ ion/cm.$^3$, and maintaining a RF power density between 10 and 20 watts per square inch.

2. The method of claim 1 wherein the positive impurity ion density of said target is of the order to $1\times10^{17}$ ions per cm.$^3$.

3. The method of claim 1 wherein said power density is maintained in the range of 15 to 20 watts per square inch.

4. The method of claim 1 wherein said phosphosilicate glass layer thickness is in the range of 650 to 3,000 A. thick.

5. A method of claim 1 wherein said layer of phosphosilicate glass is at least 1,000 A. thick.

6. The method of claims 1, 2, 3, 4, or 5, wherein said semiconductor is primarily silicon and said target is primarily silicon dioxide.

* * * * *